United States Patent
Pandit et al.

(10) Patent No.: US 6,529,890 B1
(45) Date of Patent: Mar. 4, 2003

(54) METHOD FOR REPRESENTING SYNOPTIC CLIMATOLOGY INFORMATION IN A CLASS-OBJECT-ATTRIBUTE HIERARCHY AND AN EXPERT SYSTEM FOR OBTAINING SYNOPTIC CLIMATOLOGY INFORMATION

(75) Inventors: Nitin S. Pandit, Fairfax County, VA (US); Chidambaram Subramanian, PG County, MD (US); Mark Stunder, Montgomery County, MD (US); Tim Sletten, Montgomery County, MD (US); Kevin Higgins, Albemarle County, VA (US); Nikhil Samant, Fairfax County, VA (US)

(73) Assignee: Ensys, Inc., Vienna, VA (US)

( * ) Notice: Subject to any disclaimer, the term of this patent is extended or adjusted under 35 U.S.C. 154(b) by 0 days.

(21) Appl. No.: 09/136,729

(22) Filed: Aug. 19, 1998

(51) Int. Cl.[7] .................................................. G06N 5/00
(52) U.S. Cl. ............................................ 706/47; 702/2
(58) Field of Search ........................... 706/47, 2; 702/2

(56) References Cited

U.S. PATENT DOCUMENTS 5,943,629 A * 8/1999 Ballard et al. .................. 702/2

OTHER PUBLICATIONS

Helvey, R.A., Refractive variability using automated isentropic cross–section analysis, Geoscience and Remote Sensing Symposium, 1994. IGARSS '94. Surface and Atmospheric Remote Sensing: Technologies, Data Analysis and Interpretation., International Volum, Aug. 1994.*

Helvey, R.A.; Rosenthal, J.S., Guidance for an expert system approach to elevated duct assessment over the Northeastern Pacific Ocean, Geoscience and Remote Sensing Symposium, 1994. IGARSS '94.Surface and Atmospheric Remote Sensing: Technologies, Data Ana, Jan. 1994.*

* cited by examiner

Primary Examiner—Wilbert L. Starks, Jr.
(74) Attorney, Agent, or Firm—Chid Subramanian

(57) ABSTRACT

An expert system for synoptic climatology. The expert system comprises a user interface that interacts with a user to obtain geographical information. An inference engine executes expert rules based on the geographical information. A synoptic climatology knowledge base provides the inference engine with the expert rules. A method for representing geographical information related to synoptic climatology for use in the expert system. The method comprises partitioning the world into climatic regions. The climatic regions are partitioned into subregions. The subregions are partitioned into zones of climatic commonalty. The climatic regions, subregions and zones of climatic commonalty are put into a frame hierarchy.

35 Claims, 15 Drawing Sheets cP = Continental Polar
cT = Continental Tropical

UL = Upper-Level
LL = Lower-Level

Class

Object

Attribute

METHOD FOR REPRESENTING SYNOPTIC CLIMATOLOGY INFORMATION IN A CLASS-OBJECT-ATTRIBUTE HIERARCHY AND AN EXPERT SYSTEM FOR OBTAINING SYNOPTIC CLIMATOLOGY INFORMATION

GOVT-INT: ACKNOWLEDGEMENT OF SPONSORSHIP

This invention was made with government support under Air Force Contract No (F19628-95-C-0173) sponsored by the U.S. Air Force, Hanscom Air Force Base, Geophysics Directorate, Philips Laboratory, Mass., USA. The Government has certain rights in this invention.

REFERENCES

Brody, L. R., 1977: Meteorological Phenomena of the Arabian Sea. Naval Environmental Prediction Facility, Montery Calif.

National Intelligence Survey 30 & 32, 1970: Iraq/Arabian Peninsula, Section 23, Weather and Climate. U.S. Central Intelligence Agency, 86pp.

National Intelligence Survey 55, 1965: Ethiopia and the Somalilands, Section 23, Weather and Climate. U.S. Central Intelligence Agency, 69pp.

NAVENPREDRSCHFAC,1980: Weather in the Indian Ocean to Latitude 30 South and Longitude 95 East including the Red Sea and Persian Gulf, Part II, The Gulf of Aden and West Arabian Sea to Longitude 60 East. TB 80-02, Vol 2, NERPF, Monterey, Calif., 118pp.

Vojtesak, M. J, K. P. Martin, G. Myles, 1990: SWANEA (Southwest Asia-Northeast Africa), A Climatological Study--Volume I, The Horn of Africa. USAF Environmental Technical Applications Center, Scott AFB, Ill., 242pp.

Rich, Elaine, "Artificial Intelligence," McGraw-Hill, 1983.

Handbook of Artificial Intelligence, vol. 1, edited by Avram Barr and Edward Feigembaum (William A. Caufmann, Inc., Los Altos, Calif., 1981).

Hayes Roth, F., Waterman, D. A. and Lenat, D. B., "Building Expert Systems," Addison-Wesley Publishing Company, Reading, Mass., 1983.

BACKGROUND OF THE INVENTION

1. Field of the Invention

This invention relates to an expert system for obtaining information about synoptic climatology. It further relates to a method for representing synoptic climatology information in a frame based hierarchy.

2. Description of the Related Art

2A. Artificial Intelligence and Expert Systems

This invention presumes that the practitioner is familiar with knowledge-based systems terminology, including object-oriented programming techniques as well as terminology used for knowledge processing applications that is, applications conventionally associated with the field of artificial intelligence (AI). This invention also presumes that the practitioner is familiar with terminology in the field of synoptic climatology. This invention relates to the field of artificial intelligence, for example to the field of expert systems or knowledge-based systems. It is to be noted that practitioners in this field use the terms expert systems and Knowledge-based Systems interchangeably. Within the scope of this application and invention, the terms Knowledge-based Systems and expert systems to mean the same thing. Principles of AI and Expert Systems are described in detail in U.S. Pat. Nos. 5,313,636, 4,930,071, 4,918,621 and 4,675,829 all of which are incorporated herein by reference.

Artificial intelligence (AI) technology is a branch of computer science with an ultimate goal of providing a machine that is capable of reasoning, making inferences and following rules in a manner believed to model the human mind. There have been substantial advances in the theoretical aspects of AI though much remains to be done. Principles developed in Artificial intelligence theory are increasingly finding applications. It is being accepted now that AI principles can be effectively applied to develop better computer software. AI also provides users sophisticated ways to use computer power to solve day to day practical problems. These include assisting in the analysis of massive amounts of relatively unprocessed data to aid in decision-making processes.

It is helpful to understand what is meant by knowledge and a knowledge base as now understood. Knowledge in the pragmatic terms of artificial intelligence is described in terms of its representation. Knowledge is a combination of data structures and interpretive procedures which, if suitably manipulated (as by a suitably programmed computing machine), will lead to what might best be termed "knowledgeable" behavior. A knowledge base is a set of knowledge representations which describes a domain of knowledge. See generally Elaine Rich, McGraw-Hill Book Company, New York, N.Y. (1983) (hereinafter Rich). A knowledge base is to an artificial intelligence environment what a database is to a conventional computer program. Unlike a database, however, a computer knowledge base can include executable program material within a defined record, herein called a slot, and is separate from the inference engine and control strategy used for problem solving within the domain of expertise being modeled.

Knowledge representation techniques and theories are still evolving. Nevertheless, knowledge representation techniques appear to be classifiable into various categories depending on the type of knowledge being represented. One category of knowledge is descriptive knowledge. This category of knowledge representation provides techniques for the collection and organization of facts, ideas or entities which might be acted upon. The basic units of descriptive knowledge are generally called frames, as hereinafter explained. They have also been known variously as units, concepts or objects. The term frame lacks some precision of meaning due to its use in other disciplines. Therefore, hereinafter a basic unit of descriptive knowledge is denoted a knowledge representation frame or KR frame. A KR frame contains one or more slots.

Another category of knowledge representation is that of procedural knowledge in the form of rules or structured reasoning procedures. This category of knowledge representation includes techniques which emulate the human mind's structural capability to make choices. The premise-conclusion (IF THEN) format is a typical representation of a procedural knowledge conditional expression. Procedural knowledge emphasizes action and is encoded into a knowledge base as a rule in conditional expression form. The procedural knowledge may reside in a slot of a KR frame.

The knowledge base has expert rules of thumb (or heuristics) that are extracted from a domain expert. A typical rule is in the form, for example:

If

Condition A is satisfied.

Condition B is satisfied. AND

Condition C is satisfied. AND

Then

Assert D AND

Perform E.

That is, if a plurality of conditions are satisfied in a given problem state, then assert a new condition to the problem state and perform a new step that changes the problem state. Some conditions are satisfied from existing data and some are satisfied after querying the user for additional data. In this example, if a set of conditions A,B and C are satisfied in the given problem state, then condition D should be asserted to the problem state and step E should be performed on existing data.

The inference engine performs the task of executing or applying the rules in the knowledge base to a problem domain. It matches the conditions on the "If" side to the problem state and performs the necessary steps to apply the "Then" side. In contrast to conventional programs, the inference engine of AI systems also selects which rule to apply next, from the set of heuristic rules. Therefore the "knowledge" for the knowledge base is embedded within the rules as well as in the structure of the inference engine. A key feature of the steps followed in the process is the iterative "reasoning" process.

The third category of knowledge representation is that of logic programming wherein knowledge required to derive facts logically from a set of statements is represented with first order predicate calculus statements. Examples of languages using logic programming are the language of the so-called fifth generation computers of the Japanese, called PROLOG and the language MRS employed at Stanford University.

Often domain knowledge, represented with various techniques such as those described above, can be organized naturally in a hierarchical structure. The key to the use of hierarchical structures is the concept of connecting relations between structures of data or knowledge through which information about attributes may pass to other structures of data or knowledge. One of the major contributions of artificial intelligence is the concept of inheritance to provide the connecting relations in a hierarchical structure. The concept of inheritance has a number of advantages. First, an inheritance mechanism allows the specification of many components of a data structure or knowledge structure through reference to other data structures or knowledge structures. As used herein, high-level data structures or knowledge structures refer to organized collections of simpler data structures or knowledge structures, such as a collection of various relations in a relational database sense, or a collection of logical assertions as in the predicate calculus sense. Second, an inheritance mechanism can assure consistency among high-level data or knowledge structures. That is, the inheritance mechanism can be used to specify that a given data or knowledge structure must obey restrictions placed on characteristics from other data or knowledge structures. Third, the inheritance mechanism allows the implementation of semantics. That is, the inheritance mechanism is a technique for combining higher level concepts and specifying meaning.

The concept of representing knowledge as hierarchical data structures with inheritance was first referred to in terms of "frames" by its most prominent early supporter, Marvin Minsky of the Massachusetts Institute of Technology. Professor Minsky gave the first general description of the concept and laid the intellectual groundwork for development of practical systems implementation of a frame-based system. Subsequent work in first generation knowledge representation systems produced very stylized inheritance mechanisms lacking in flexibility or yielding inheritance structures which were cumbersome and so slow as to be of only limited utility in large knowledge bases. The overall rapid progress of AI and computing has made feasible the application of such concepts for solving real life problems.

There have been considerable debates in technical literature regarding what constitutes a KBS. See generally Fredrick Hayes-Roth, Donald A. Waterman & Douglas B. Lenat, Addison-Wesley Publishing Co., Inc., Reading, Mass. (1983) (hereinafter Hayes-Roth). Hayes-Roth defines a KBS to comprise a knowledge base and an inference engine. Knowledge-Based Systems (KBS) is one of the most visible applications of Artificial Intelligence. It has concentrated on the construction of high-performance programs in special professional domains. KBS places emphasis on the knowledge that underlies human expertise as opposed to domain independent problem solving strategies.

To build a KBS therefore, it is important to recognize expertise, which in any domain composes of both public articulable knowledge as well as private knowledge, which is often inarticulabe, fuzzy and available only to experts. This private knowledge consists largely of rules of thumbs (or "hunches") which are often called as heuristics. Heuristics enable the human expert to make educated guesses when necessary, to recognize better steps from a set of possible alternatives as well as to deal effectively with erroneous data.

By representing both private and public knowledge about the domain, a KBS attempts to elucidate, reproduce and enable computer systems to effectively use expert knowledge in performing its tasks. KBS are used in computer systems that help in interpretation, diagnosis, design, planning, monitoring, etc. KBS are used either stand-alone or as a part of an integrated software system, for example a CAD system, which often houses public or articulable knowledge. An ideal KBS consists of an interface that interfaces with a user or another computer program, a work area for storing intermediate results, a knowledge base that is the heart of the KBS—comprising facts and rules of thumb/heuristics that help with the system or with the planning, a scheduler that enforces an order for processing the rules, a consistency checker and an explanation facility.

Building a KBS typically involves two people; a domain expert and a knowledge engineer. Initially the knowledge engineer and the expert identify and scope out the problem area. Then they explicate the key concepts, relations and information-flow characteristics needed to describe the problem-solving process in the domain area. The key concepts and relationships are then formalized into a representation scheme that can be input to the computer. The representation schemes used might involve data structures that are well known or that are specifically formulated for the current problem domain. Finally the representation is implemented in a computer system and tested. In building KBS, the elucidating and representing the expert knowledge are the crucial steps in the knowledge engineering process.

To aid in an understanding of this invention, a glossary of terms is included herein below.

The following is a glossary of some of the terms used in these technologies.

Data: Raw facts or values which are physically recorded and which can be extracted and objectively verified.

Information: Anything learned from data, i.e., the "meaning" of data.

Value: An amount of worth.

Knowledge: Abstractions, categorizations and generalizations derived from data which cannot be easily objectively verified.

Knowledge Base (KB): A computerized collection of knowledge organized into a taxonomy and including a theory (calculus) for interpreting the knowledge about subject.

Knowledge-Based System (KBS): The software and hardware environment supporting a knowledge base.

Knowledge Processing: Application of inferences to data and knowledge to obtain further knowledge.

File: A bounded storage element of a computer-based storage system.

Knowledge Base Terms:

Object: Elemental accessible entity of a knowledge base file; the elemental abstract entity of knowledge about a subject; a structure of information which describes a physical item, a concept or an activity, including a group of other objects.

Frame: A frame or object may differ in characteristics depending on the theory of interpretation associated with the knowledge base.

Slot: An elemental entity of an object, analogous to a database field; represents characteristics of an object.

Class: A unit which describes a category or group of objects.

Member: A unit which is contained within a class. If Unit A is a member of Class B, then Class B is a Parent of Unit A.

Inference: A conclusion drawn about an object from premises or facts.

Inheritance: The process of transferring characteristics (slots and their values) to an object from its ancestors in the context of the process for interpreting the knowledge base.

(Put working memory and conflict set here?)

Other terms will be defined in the context of the invention hereinafter explained.

2B. Synoptic Climatology

In meteorology access to, and preservation and fusion of, data and information have become an ever increasing challenge. This is not a unique problem, in a world with rapid technological advances sometimes capturing and accessing even the most basic or remote information can become unexpectedly difficult. This problem is further exacerbated in a military setting where the turnover of personnel can be frequent and rapid making it more difficult to obtain, retain, and assimilate information and expertise. Military forecasters seldom remain in one location long enough to gain the experience needed to obtain a good feel for the weather trends in that location. This lack of experience prevents the forecaster from producing the best possible forecast for their assigned location. The problem is further compounded by rapid deployment into a hot spot. In this case weather personnel must quickly come up to speed in an area with which they have little or no previous experience. The knowledge of expert climatologists to perform such tasks is the domain of this invention.

SUMMARY OF THE INVENTION

It is the object of the present invention to solve the problems associated with obtaining accurate meteorological information in distant areas of the world using the advances in the field of AI and expert systems. It is an object of this invention to meet the meteorological information challenge for distant regions of the world.

Specifically, it is an object of this invention to develop an expert system for obtaining synoptic climatology information for various regions of the world.

It is another object of this invention, to provide a method for knowledge representation, said knowledge capturing the synoptic climatology information about various regions of the world.

It is another objective of this invention to provide a computer product that enables the user to obtain (and manipulate?) expert information on synoptic climatology of various regions of the world.

To meet the objectives of this invention, there is provided an expert system for synoptic climatology comprising a user interface; an inference engine; and a synoptic climatology knowledge base. Further embodiments of the present include an expert system wherein the user interface comprises geographical information in the form of digitized maps, an expert system the geographical information is a Geographic Information System. A further improvement includes an expert system wherein the user interface further comprises a window for displaying maps, a window for displaying temperature, a window for displaying wind speed, a window for displaying rainfall, a window for displaying visibility, and a window for displaying cloud cover.

Another aspect of the present invention is a method of representing geographical information for use in an expert system for climatology comprising partitioning the world into climatic regions, partitioning said climatic regions into subregions, partitioning said subregions into zones of climatic commonality and putting said climatic regions, said subregions and said zones of climatic commonality into a frame hierarchy. A further improvement is a a method wherein said climatic regions comprise southwest Asia and northeast Africa. A further improvement is a method wherein said climatic region of southwest Asia and northeast Africa is partitioned into subregions of horn of Africa, middle eastern peninsula, near east mountains and Mediterranean coast & northeast Africa.

Yet another aspect of the present invention is a computer program product including a computer readable set of instructions and a computer media that enable the computer to perform according to steps of:

inputting geographical information, inputting time information, inputting abnormal condition information, running an expert system rule base for climatology and receiving climatological information. Further improvements include the computer program product being in C++ (and Prolog and MapObjects?). Further improvements include the rule base being in a production system.

BRIEF DESCRIPTION OF THE DRAWINGS

The above objects and advantages of the present invention will become more apparent by describing in detail preferred embodiments thereof with reference to the attached drawings in which.

(General comment: all the figures should have titles)

DETAILED DESCRIPTION OF THE INVENTION

Described is a preferred embodiment of the invention called a synoptic climatology expert system that uses an expert system approach to explain synoptic climatology phenomena. Synoptic climatology expert system incorporates an interactive library of synoptic climatologies using a class-object-attribute hierarchy. A synoptic climatology expert system according to the preferred embodiment is meant to define regional climatology and to be used as an aid in mission planning, personnel training, or in the development of meteorological decision systems, such as in the fields of agro-meteorology, air quality, and hydrology. It also serves as a reservoir of synoptic information (rules, statistical data, weather summaries which will assure the preservation of knowledge.

The synoptic climatology expert system according to the preferred embodiment provides the user with climatological information (temperature, sky cover, wind, visibility, precipitation) for geographic subregions within the Horn of Africa as well as descriptive and statistical (frequency, movement, intensity, etc.) information for the various synoptic features that affect the Horn of Africa. Most importantly however, synoptic climatology expert system employs an extensive set of IF-THEN rules that allow the user to manipulate (change position or intensity) of synoptic features and view the associated meteorological effects or changes which result. This is one of the important aspects of synoptic climatology expert system reflecting the fact that knowledge is not static in the knowledge base.

Figure 1:
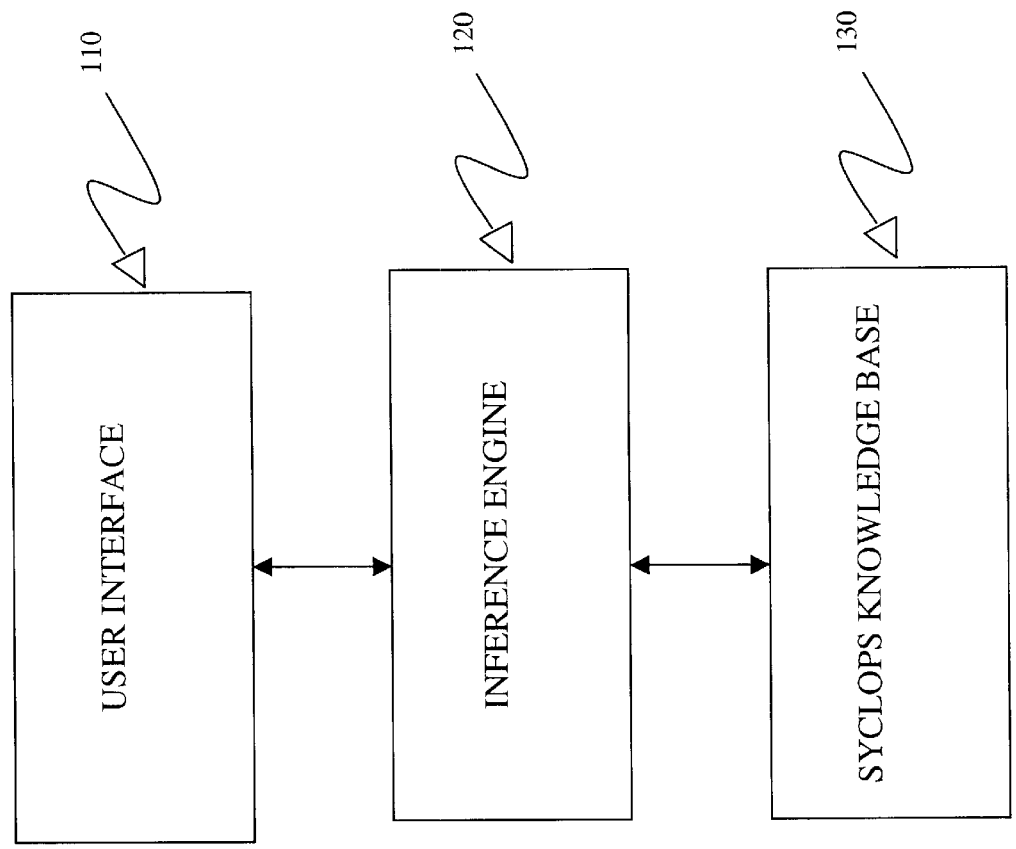
FIG. 1 is a representation of the present invention. (Do you want to say Syclops in the Figure?)

FIG.1 shows an overview of the system according to the present invention. The user interfaces with the system in 110. The data provided by the user is used to access the inference engine 120. The inference engine uses the knowledge base 130 to provide information to the inference engine.

The synoptic climatology expert system is described for the Horn of Africa. However, this is not meant to restrict to restrict the scope of this invention. This invention covers any climatic region of the world. This invention defines a structure and functionality that could be applied to other regions of the world both for both military and non-military applications.

Designing synoptic climatology expert system using expert system principles has several immediate benefits. Expert systems are well suited to the challenge of consolidating and preserving meteorological expertise. An expert system goes beyond data or information storage and retrieval capability. Embedded with the meteorological data and information is the expertise or knowledge (rules) which can interpret the information and data. In other words, knowledge is not static; the expert system can accept inputs, evaluate those inputs, and give back to the user a result such as a new set of meteorological information. Also of importance are the flexibility and explanation capabilities of expert systems. Unlike conventional programs, an expert system can show the logic used in reaching a result. Thus the user is not just presented with output, but can see how a result was obtained.

How synoptic climatology expert system is designed can be best described in terms of the following three components; 1) a class-object-attribute data/knowledge structure, 2) modular structure and rule organization and, 3) an underlying Geographic Information System (GIS) element and interface. Each is discussed below.

Object Oriented Data/Knowledge Representation Scheme (General comment: Should we refer to 'climatological' applications and not confuse them with the difference with meteorology?)

Figure 5:
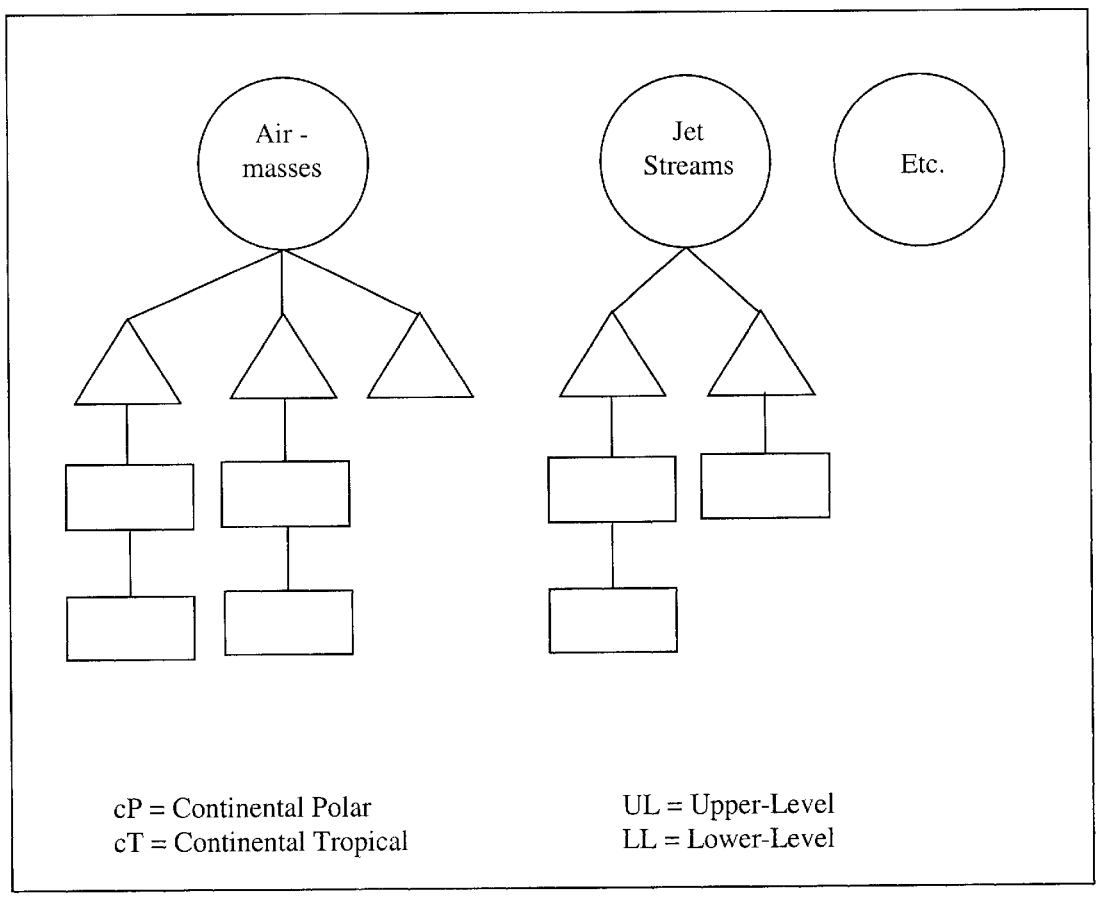
FIG. 5 shows an object-attribute-value hierarchy according to the present invention.
Figure 5:
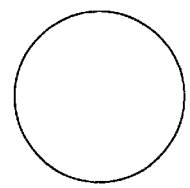
Figure 5:
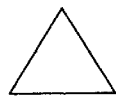
Figure 5:

An object oriented hierarchical data/knowledge structure is well suited to meteorological applications. Meteorological features occur on different spatial and temporal scales, and have a set of characteristics (pressure/intensity, temperature, etc.) which can be described or quantified. In other words meteorological phenomena can be grouped into classes (ex. airmasses, extratropical cyclones, jets, etc.), based on scale or other criteria, and then defined as unique objects (ex. maritime tropical airmass, cold front, etc.). Each object's characteristics are defined by attributes (ex. temperature, wind speed) which are assigned unique values or descriptions based on one or several factors, including the time of year. Using this structure, the synoptic climatology of a region can be represented. FIG. 5 shows an example of a class-object-attribute hierarchy.

Figure 3:
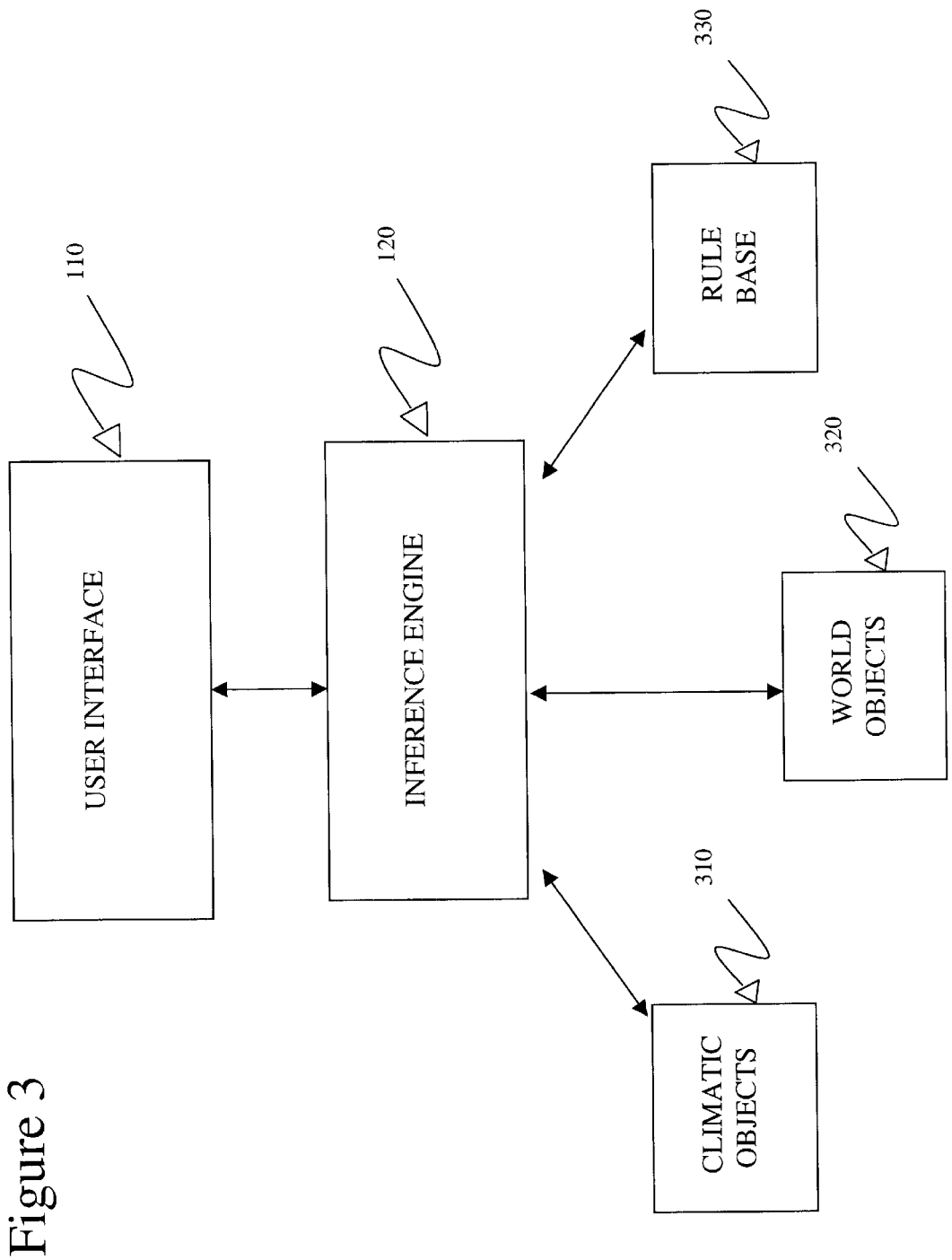
FIG. 3 is a detailed diagram of a knowledge base according to the present invention.

FIG. 3 shows the various type of objects and rule bases used by the inference engine 120. 310 is the set of climatic objects used by the system. 320 represent the set of world objects and 330 represents the various rule bases used by the system.

The class-object classification used in synoptic climatology expert system according to the preferred embodiment for climate controls is shown in FIGS. 9–15. These hierarchies are self-explanatory to one skilled in the art and do not need any further explanation.

At the lowest level (ex. extratropical cyclones) individual objects (ex. Atlas Low) are defined. Attribute values not assigned at the object level are inherited down from the next highest level with a valid value. The obvious goal is to fill attribute values at the lowest level possible avoiding inheritance of the less useful general information defined higher in the hierarchy. However, the ability to fill data slots (attribute values) when more specific data is unavailable allows synoptic climatology expert system to run in data sparse regions. In all cases whether through rules, inheritance, or user input synoptic climatology expert system attempts to fill attribute values with the most specific (lowest level) data available to the system.

Two types of attributes (statistical and descriptive) have been defined. Statistical data is assigned to attributes such as temperature and sky cover. Descriptive information is assigned to an attribute called "weather". The weather attribute can be considered a "catch all" as it presents a means to handle information that cannot be readily incorporated into the data structure. For example, an attribute value of 30–40 percent for cloud cover can be misleading.

The descriptive weather attribute can be used to present an alert to the user that cloud cover between 0500 and 0800 Local Standard Time (LST) is 60–70 percent.

An important advantage of this class-object data structure is that once defined it can be easily adapted to any area of the world. Object sets and associated attribute values or descriptions will vary for various geographic regions, but the underlying class-object-hierarchy is applicable everywhere. This reduces the size of the meteorological database for any given region as it can share the class-object database and higher level default attribute values from other regions.

Note, sub-synoptic scale features are included within the data structure. Although the system is geared towards synoptic climatology, the presence or absence of synoptic features as well as their characteristics (intensity, position, etc.) create or modify mesoscale effects. As a result mesoscale objects representing phenomena such as a sea breeze or a mountain valley circulation are incorporated within the system.

Modular Components and Rules

Figure 4:
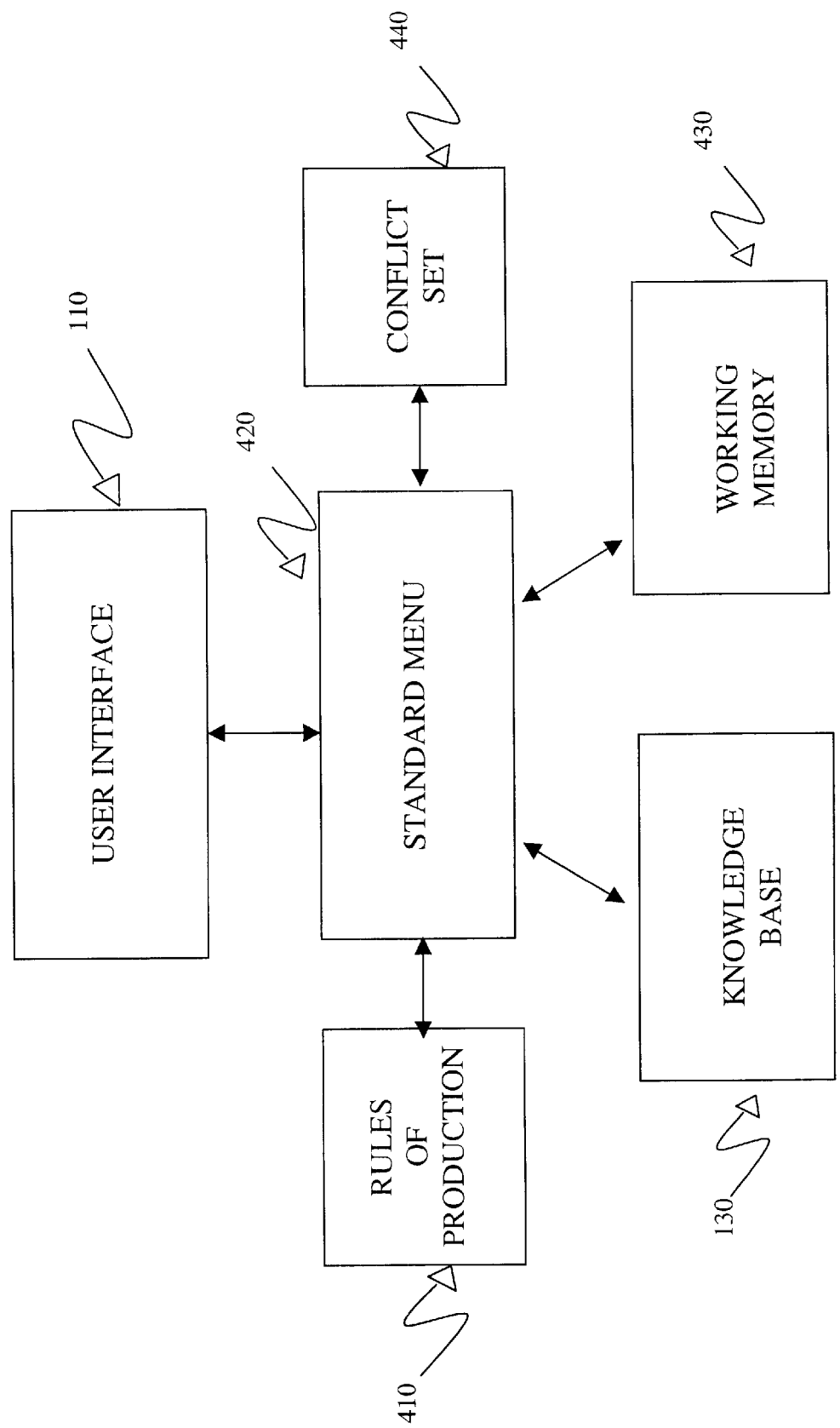
FIG. 4 is a detailed diagram of an inference engine according to the present invention.

FIG. 4 shows the inference engine in detail. 420 represents the standard memory in the system. 430 is the working memory, where data that is currently worked on is stored. 440 represents the conflict set of rules that can be fired at any stage of the system. 410 is the set of rules or productions that are available to the system.

Synoptic climatology expert system according to the preferred embodiment has three categories of rules; general, movement, and site specific. The primary function of all rules is to assign or modify (add, remove, or change) attribute values or to create the instance of a new object. Movement rules allow the system user to play what-if scenarios with displayed objects. For example, if an object's default characteristics (position, intensity) are changed by the user, these modifications may result in the appearance or disappearance of an altogether different object.

General rules, based on rudimentary meteorological theory or principles, are applied in the event that more specialized information (specific rules) are not available for a given site. For example, if a specific rule to predict the onset time of a sea breeze is unavailable, a general rule would set the onset attribute value to 1000–1200 LST regardless of the coastal location.

Figure 6:
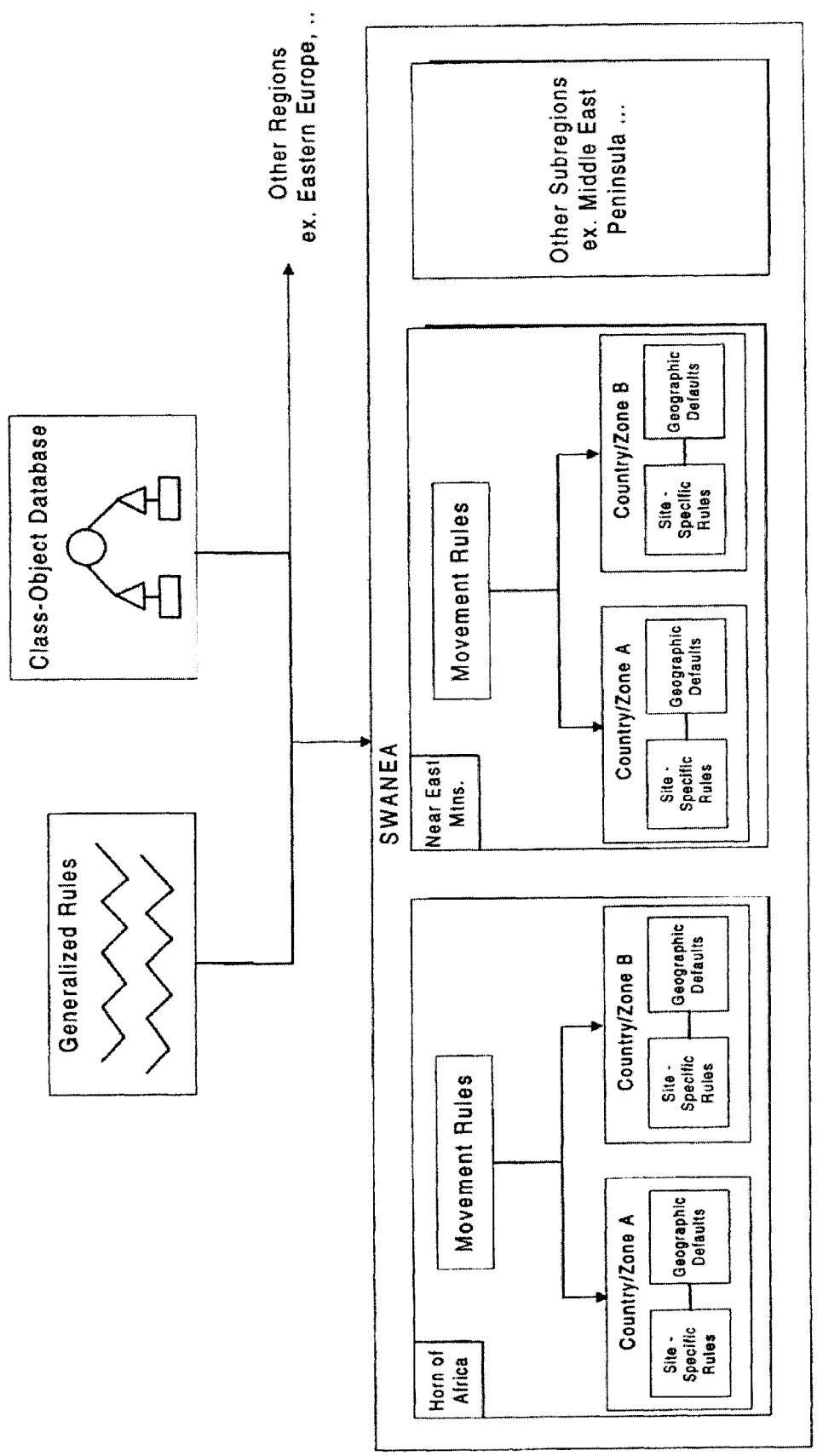
FIG. 6 shows a schematic representation of a part of a knowledge base according to one of the preferred embodiments of the present invention.

The object-oriented structure and three categories of rules support a modular design environment. The class-object data set and general rule set can be applied across multiple geographic regions, new regions would share the same data and rules. Zones within a region share the same movement rules. Specific rules are made unique to a single zone. An immediate advantage of this approach is that each region and associated sub-regions (zones) can be treated as separate modules for the purposes of system development. FIG. 6 illustrates the modular design concept used in the synoptic climatology expert system effort.

Synoptic climatology expert system according to the preferred embodiment uses a single region module (Southeast Asia Northeast Africa) with one implemented sub-region (Horn of Africa) containing four zones. Additional regions, sub-regions, or zones can be added to the existing system as separate modules or sub-modules, and are fully within the scope of the present invention.

Geographic Information Component and Interface

Most climatology and forecast rules, and data are geographically referenced. This drove the requirement to embed geographic knowledge within the system and provide the user with an interactive, geo-referenced, map based interface. Types of geographic information embedded include location of coastal zones, mountainous zones, valley regions, desert regions, cities, etc.

The interface is developed such that the user points on a map (or synoptic features/objects displayed on the map) and the appropriate geographic information (latitude and longitude, type of geographic area, etc.) linked to the selected point or feature is passed back to the expert system. This information is evaluated by the expert system and appropriate rules are fired (executed). For example, if the user has selected a point in a coastal zone then rules related to the sea-breeze are placed in the queue. If other requirements are met (no overriding gradient flow, time of year, time of day, etc.) the appropriate seabreeze rules are executed and the results are displayed to the user. The results will be displayed in, the form either of statistical data or as descriptive information. In a similar manner the interface is used to allow the user to play what-if scenarios (move or manipulate displayed synoptic features) and view the results. The new positions (latitude and longitude) and new geographic zones (if any), are passed to the expert system and the appropriate rules are queued.

Figure 2:
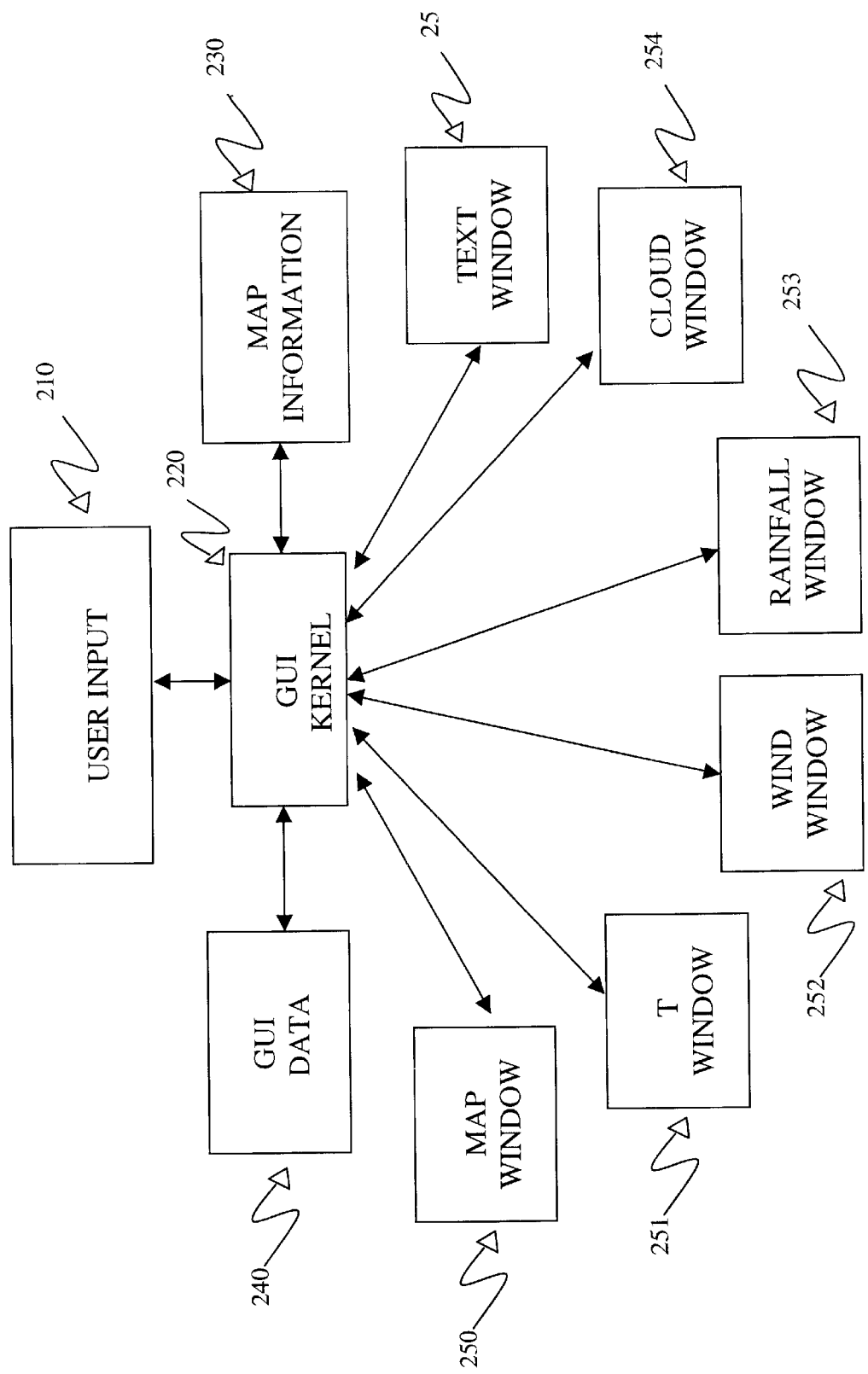
FIG. 2 is a detailed diagram of a user interface according to the present invention.

FIG. 2 shows the detailed user interface according to the preferred embodiment. The user input is entered in 210. The GUI kernel is 220, which coordinates the activities of other components within the GUI. Map information is provided by 230 and statistical data is provided by 240. The graphical output is displayed in the appropriate window in 251–254. A text window 255 displays textual information and explanation of the logical reasoning behind the various decisions.

An experts system according to this invention is best developed on a Pentium PC, and although it is recommended that the system be run on a Pentium, it is capable of running on 486 PC System running Windows 95, equipped with a CD drive, and using at least 8 mb of RAM. Development itself, was a multiple-step process that consisted of four primary tasks; Data Acquisition, Rule Development and Processing, Definition of Geographic Data Requirements and Collection of Geographic Data, and Knowledge Encoding and Graphical User Interface (GUI) Development. Each of these tasks are briefly reviewed here. (Do you want to put in the Amzi, ESRI and C++ environment description here?)

The preferred embodiment identifies and catalogs several objects for the climatology of the Horn of Africa. Included are semi-permanent and migratory features. The climate of the Horn of Africa is monsoonal. An example of some the objects which are important to the intensity, timing, and fluctuations of the monsoon in this region are the semi-permanent Mascarene High located in south-central Indian Ocean, the semi-permanent Asiatic High located over central Asia, and the Somali Jet located along the east coast of central and northeast Africa. Some examples of other types phenomena classified as objects are regional winds described by local names such as Karif, Saba and Haboob, thermal lows, and extratropical cyclones.

The inference engine relies mainly on a backward chaining strategy, with the user defining the goal (i.e., the map region and the season, or month, of interest). The relevant rules for the map region and the selected season (or month) are then searched and applied using a backward chaining control strategy in the inference engine. Even in case of the user requiring the effect of the movement of a climatic feature on the applicable map region, the object-base is searched to inform the user of all known effects using a backward chaining strategy.

Many aspects of a regions' climatic behavior can be represented directly with objects, thus emphasis was placed on building rules that described object effects. The rules themselves were based upon references/ documents collected and experts interviewed. The rules were initially developed in an IF-THEN English format, and were encoded under a later task. The following is an example of a typical movement rule.

IF the Object Polar Jet (PJ)=Present AND

IF the Object Subtropical Jet (SJ)=Present AND

IF PJ and SJ Location*=40 N 20 E, 40 N 35 E, 30 N 20 E, 30 N 35 E AND *(objects located in rectangle)

IF the Month=Dec, Jan, Feb, Mar, Apr THEN

WEATHER ATTRIBUTE=Genoa low formation/ intensification is likely.

The inclusion of descriptive information such as that associated with the weather attribute above, was critical to the development of a robust system. Without this type of information, synoptic climatology expert system would be primarily a library of objects with statistical property values attached, offering limited practical insight or description into actual daily and seasonal cause and effect weather changes across a region.

In conjunction with the rule development task, geographic requirements to run the rules are extracted and noted. For example, in order for the rule example shown above to execute, the latitude/longitude rectangle must be defined in the system. Most geographic data however is not limited to a simple set of coordinates such as those defining a box/ rectangle. In most cases geographic data required had irregular boundaries. Some of the other types of geographic zones or areas that are defined in synoptic climatology expert system included several mountain and coastal zones, zones of climate commonality, and many special sub-areas within zones of climate commonality.

In most cases irregular geographic areas such as a mountain zone were digitized into the system from topographic maps. In some case already digitized data available in public domain can be used. However, the resolution of such data is beyond the needs of system and when accessed slows system performance. Thus, the required geographic data is usually digitized directly.

The knowledge base, inference engine, and data structures in the preferred embodiment are encoded in the Prolog programming language. From a development perspective, one of the key issues is to provide the ability to declare objects and, their properties and constraints in a manner that enables synoptic climatology expert system to automatically apply appropriate rules. The use of Prolog programming language provides a great deal of flexibility, enabling us to implement special data types, operators, polymorphic structures and hierarchies, inheritance, message passing, conflict resolution and rules.

Figure 7:
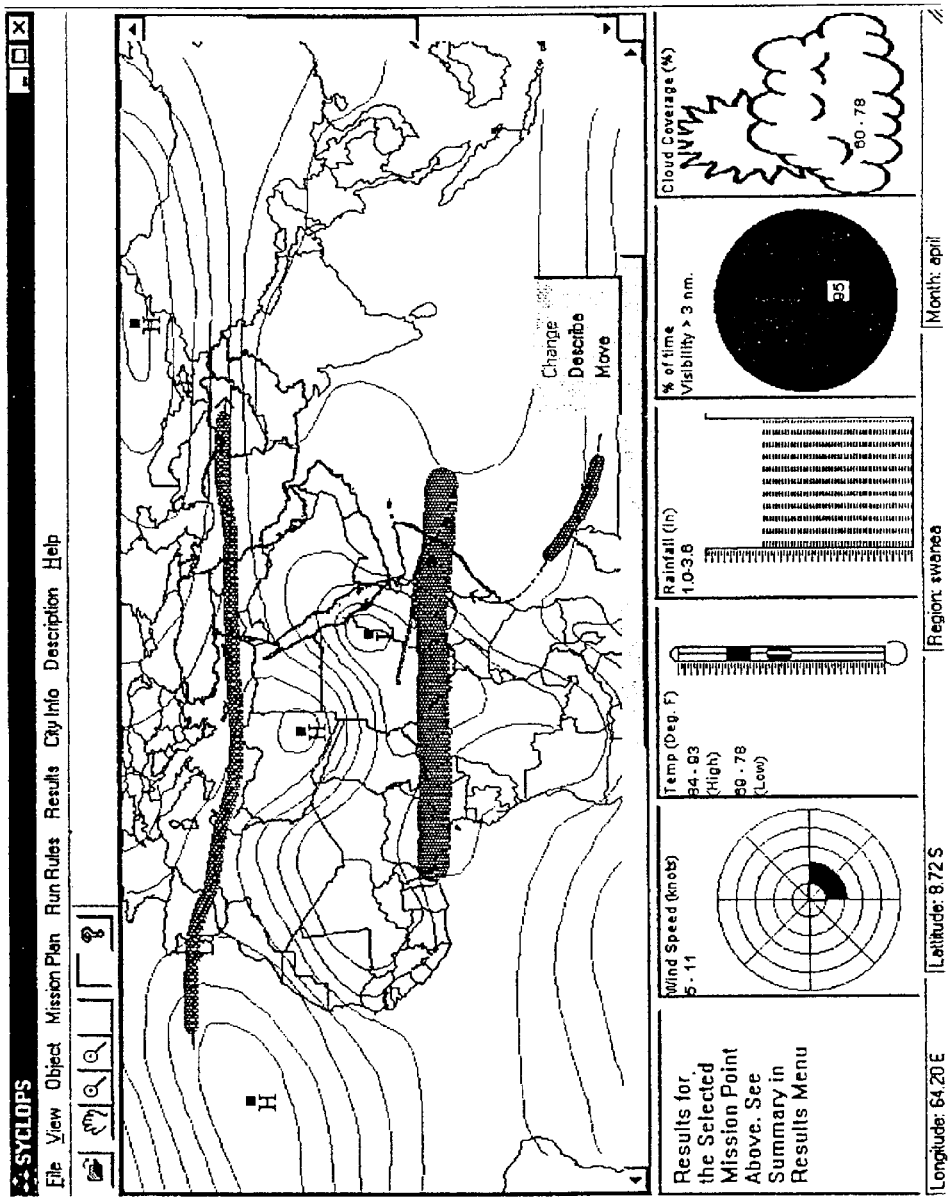
FIG. 7 shows a model screen depicting a user interface according to one of the preferred embodiments of the present invention.

The graphical user interface (GUI) according to the preferred embodiment is based on fully functional geo-referenced map displays. All data or information (ex. synoptic and mesoscale objects, etc.) displayed on maps are geo-referenced by latitude and longitude, and by geographic zone. Commercial mapping tools and C++programming language are used to build the interface and link to the expert system. The interface is developed according to industry standards using pull-down menus and a tool bar. FIG. 7 shows an example of the synoptic climatology expert system interface according to the preferred embodiment. Note, the objects shown, surface pressure systems, jets and ridges (colored shaded areas), etc., can be examined or manipulated by the user through the use of the mouse.

Synoptic climatology expert system can function in either an interactive or default mode. In a default mode the user can use the active map display to obtain statistical climate data for various cites or sites. Local video clips are also available for a small number of locations. Much of the site statistical data provided can easily be obtained from public domain sources. In the preferred embodiment, data is included in the synoptic climatology expert system as means to consolidate all types of climatic information (data, rules, synoptic objects, etc.) and demonstrate how all types of applications and information can be incorporated. In a default mode the user can also 1) select any point on the map and obtain default climate information for the climatic zone in which point selected falls or 2) select any synoptic object to obtain a description or default characteristics.

Figure 8:
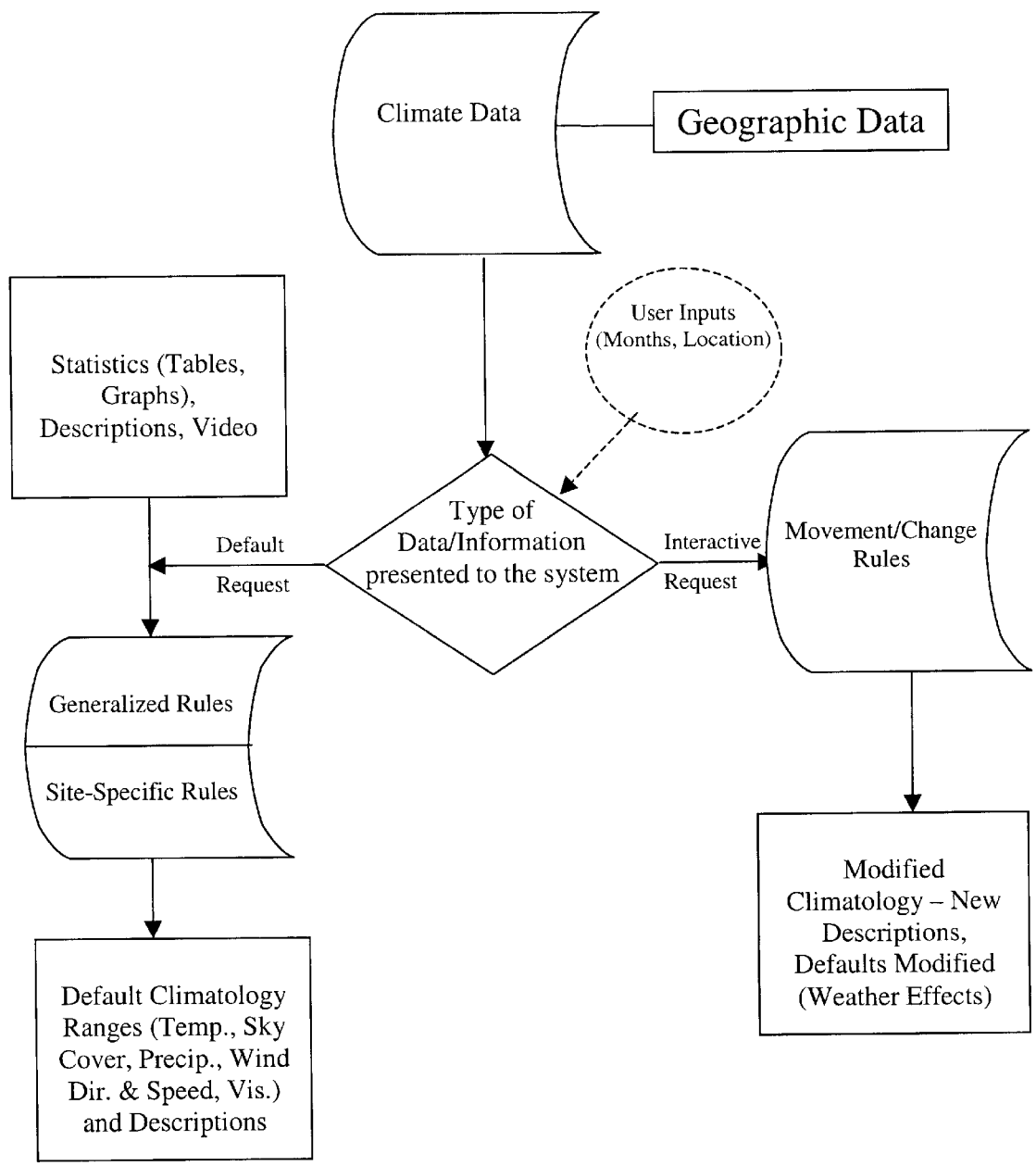
FIG. 8 shows a schematic representation of data flow according to one of the preferred embodiments of the present invention.
Figure 9:
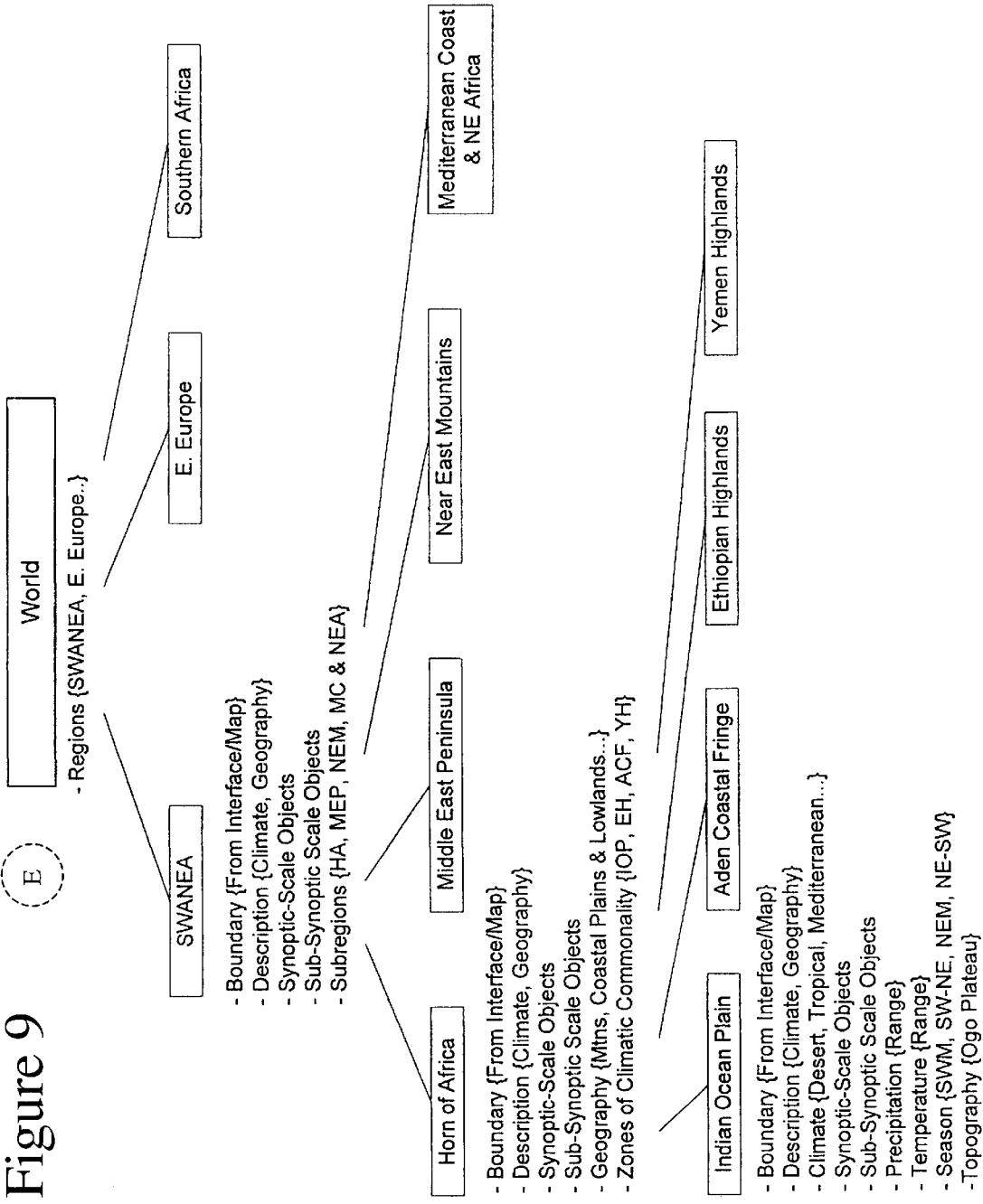
FIGS. 9–15 shows knowledge base hierarchy according to one of the preferred embodiments of the present invention.
Figure 10:
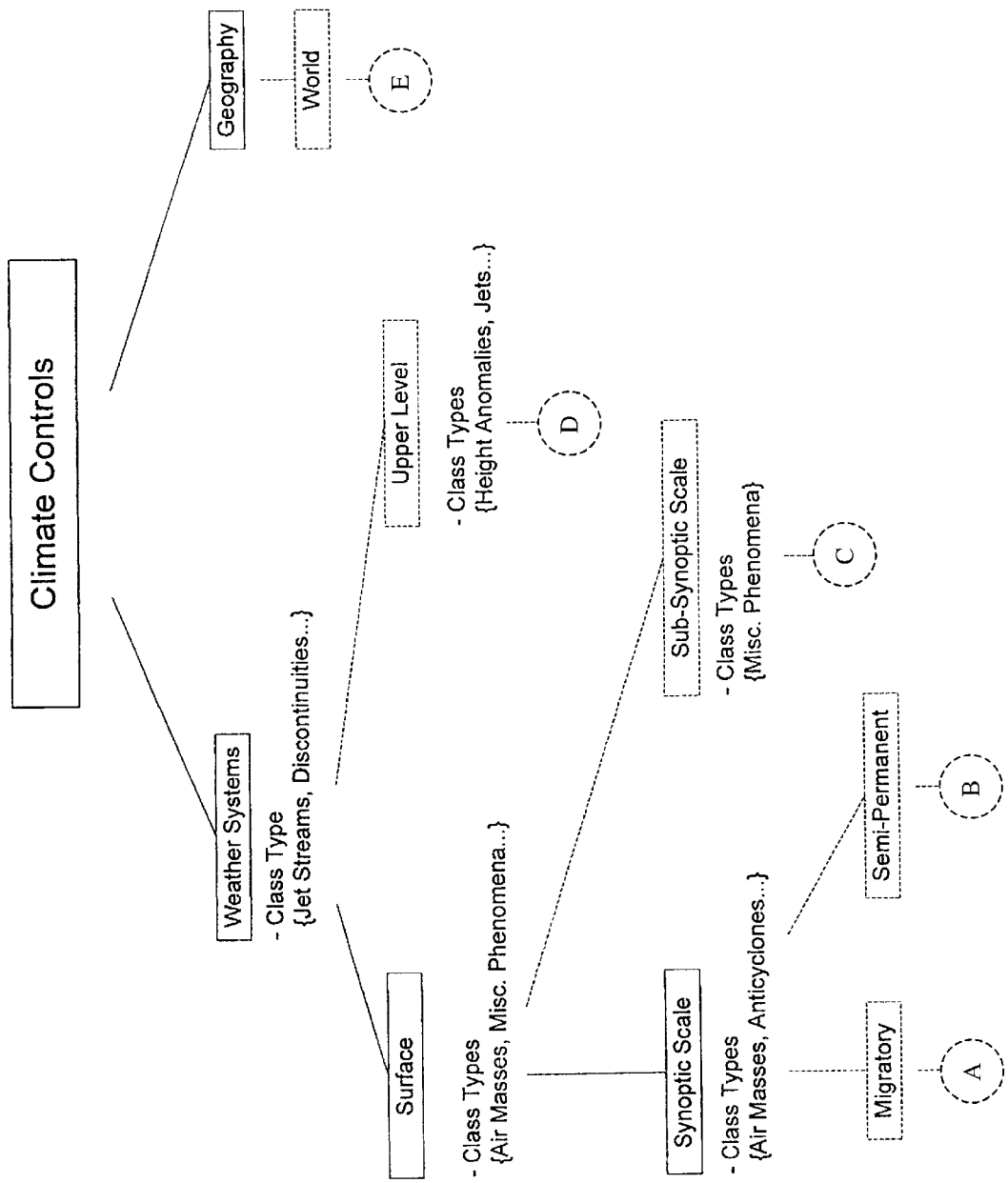
Figure 11:
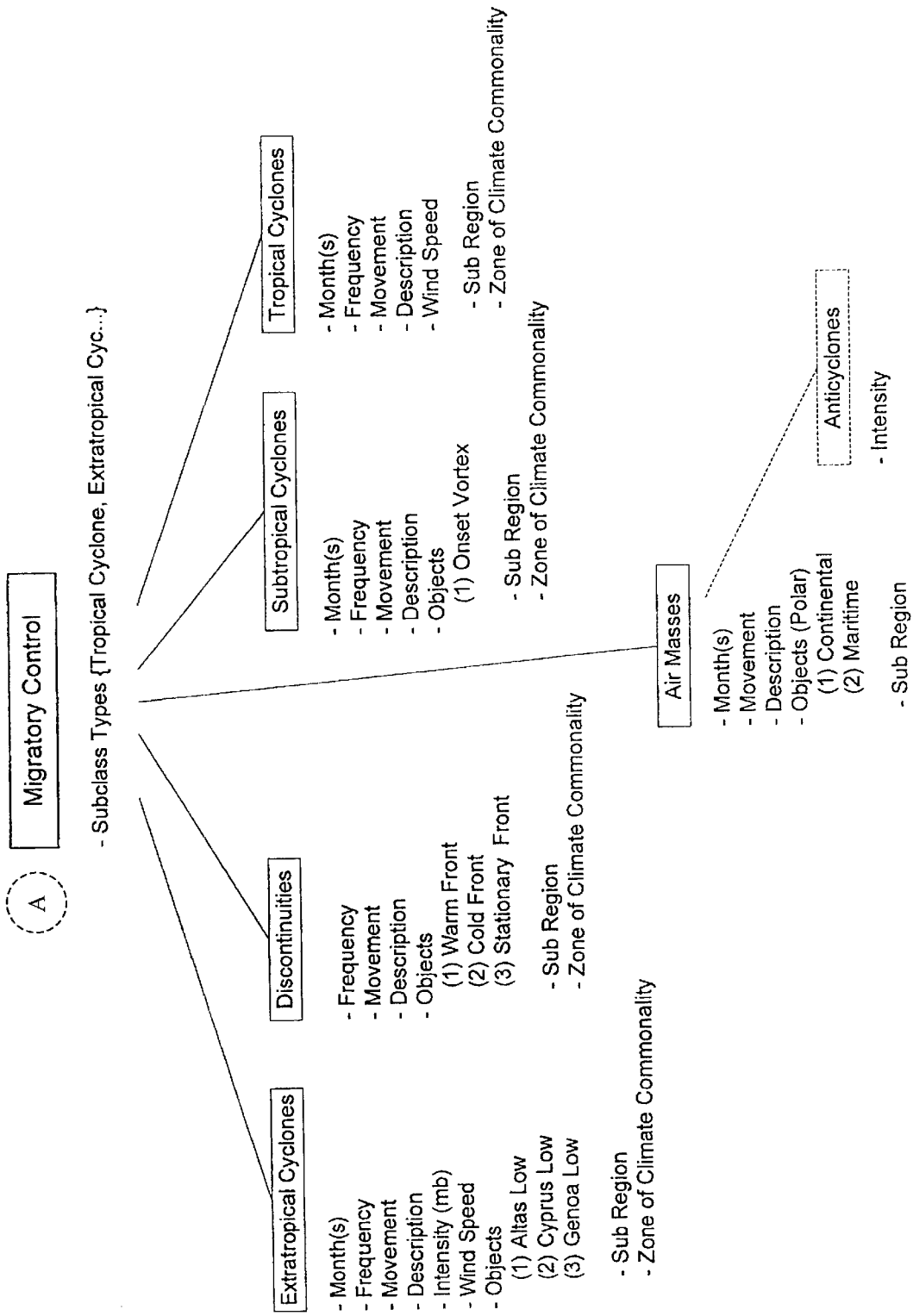
Figure 12:
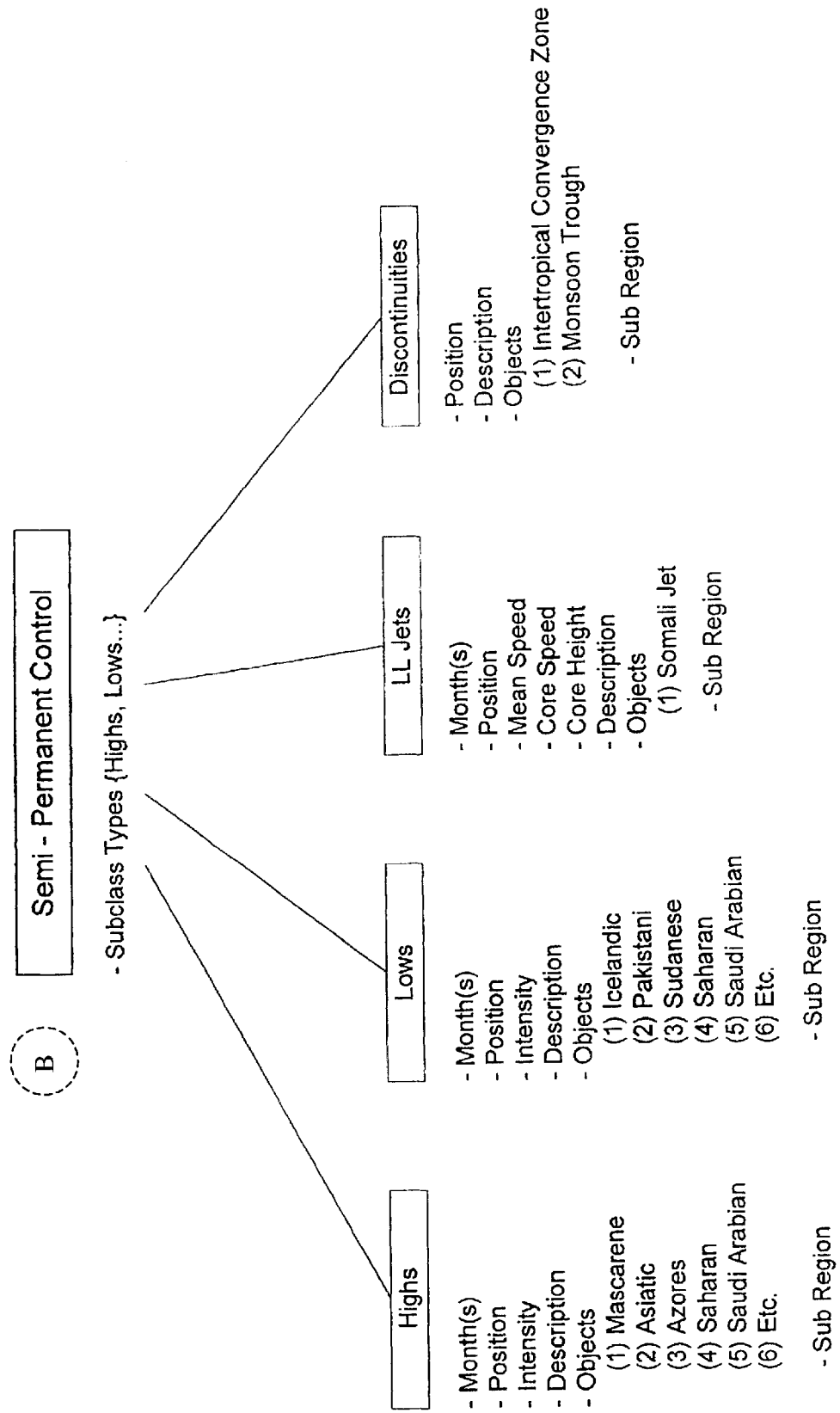
Figure 13:
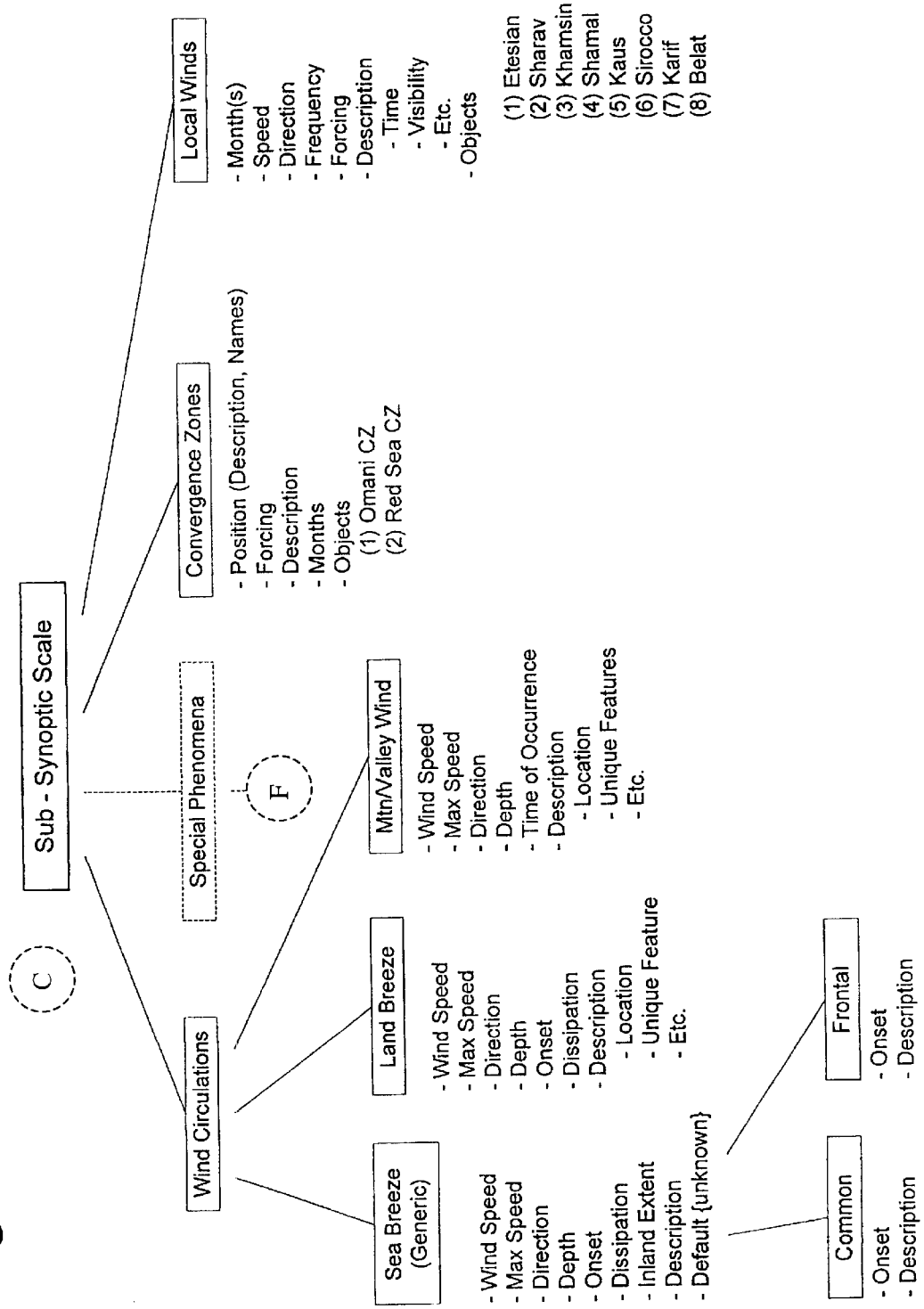
Figure 14:
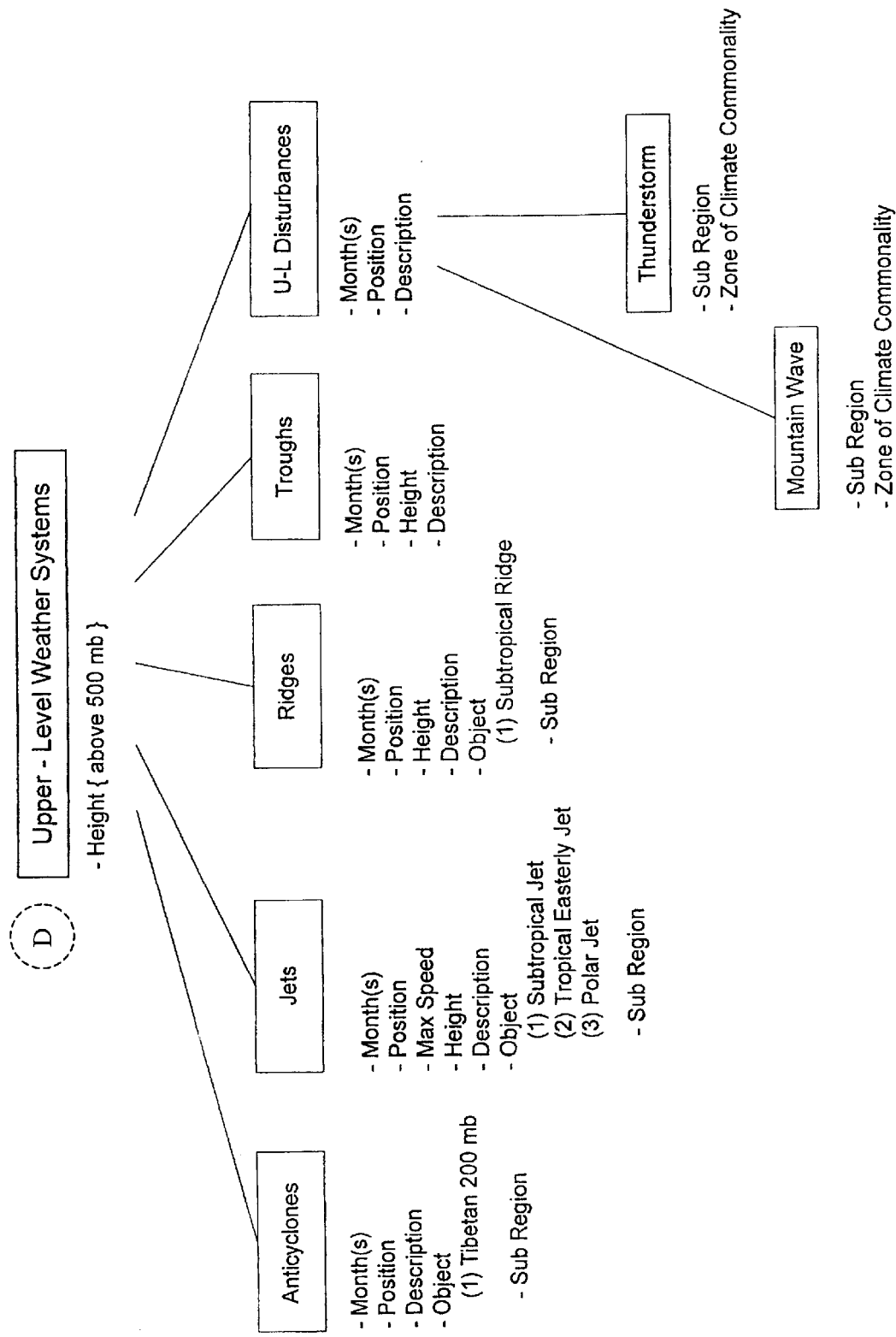
Figure 15:
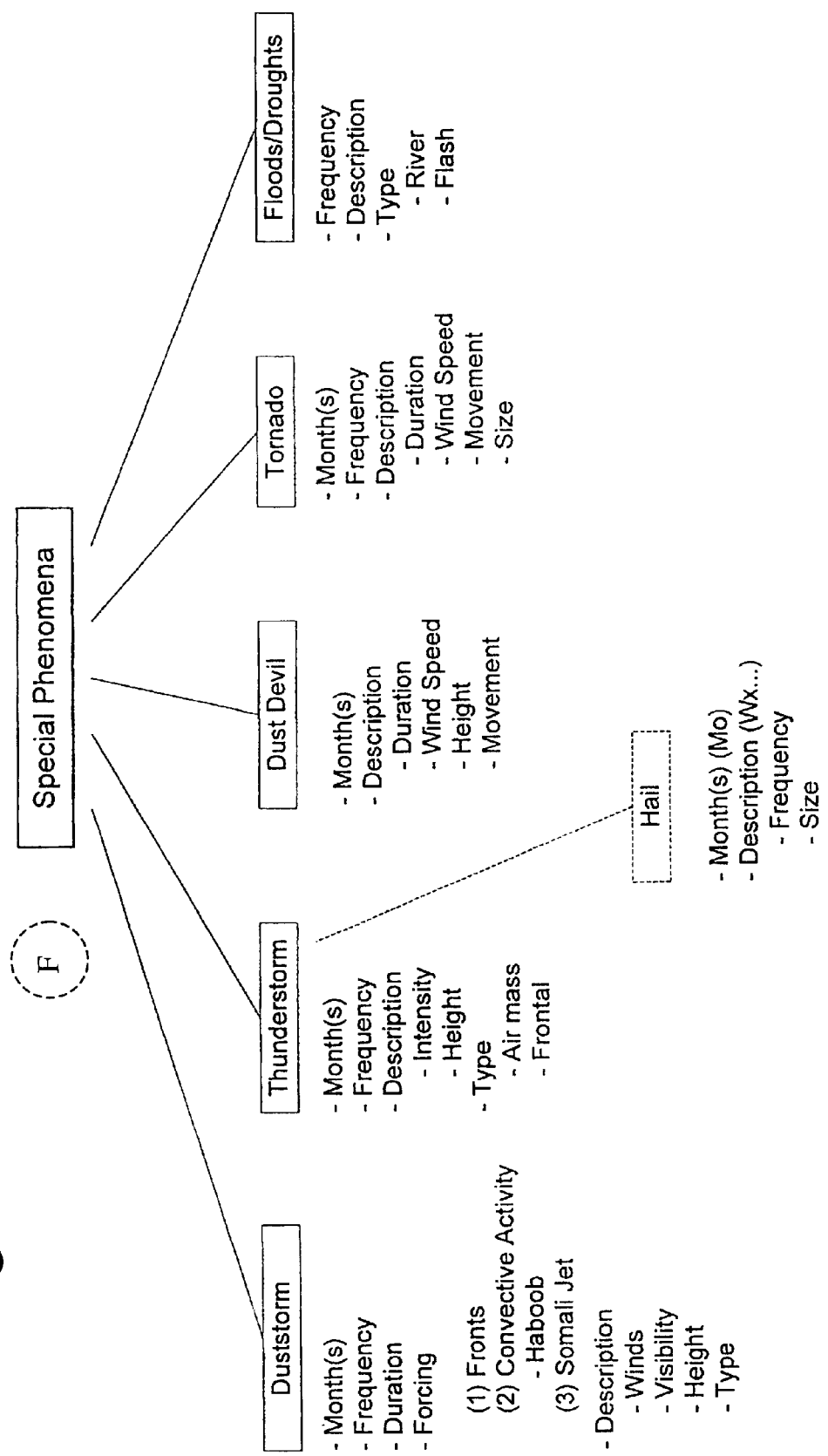

In an interactive mode the user can change the characteristics of certain objects and invoke the expert system inference engine, to obtain a new set of climatological information (not a forecasts) which results from the changes. This capability gives the user a greater feel for how various meteorological objects and inputs affect the weather of a certain area and allows the user to try to mimic the current weather trend of an area of interest. FIG. 8 Illustrates system logic and output for both the interactive and default modes.

A summary of complete system capability of the synoptic climatology expert system according to the preferred embodiment is given below:

Graphic of normal synoptic climatology by month or season (synoptic objects displayed on map)

Description of all objects (synoptic and sub-synoptic), including a description of an objects weather related impact on a country or other defined geographic region.

User ability to manipulate (change position, characteristics) certain objects and subsequently view the weather related changes that result.

Display (boundaries) of geo-referenced zones of climate commonality and key population centers.

Description of geography and climate by zone of climate commonality by month or season, including zone or site specific forecast tips or weather indicators.

Normal climatological ranges for available parameters such as; temperature, precipitation, wind, sky cover and visibility for any user selected point on a map. Note, data displayed is reflective of the area/climate zone to which the selected point belongs and thus is not necessarily unique to the point selected. Descriptive data may also be displayed.

Statistical weather data (temperature, precipitation, number of thunderstorms, etc.) in tabular and graphic form for selected cities or weather observing sites.

Video clips describing or illustrating weather threats for selected points or cities.

Explanation tool to show system user how system arrived at a particular conclusion or result.

Slots to add other applications or additional climatological information.

The (preferred embodiment of synoptic climatology expert system interface uses industry standards. A toolbar is provided with user selectable icons for functions such as opening map displays, selecting points on map displays (mission points), selecting map features and, map panning and zooming. All of these functions can also be performed using pull-down menus and are within the scope of the present invention. Pull down menus are also provided to run rules, to obtain an explanation of expert system results, to obtain descriptions of selected objects, mission points or climate zones, and to turn map display coverages on or off.

A synoptic climatology expert system session according to the preferred embodiment begins by first choosing a month and geographic region. In the prototype the user can only select the Horn of Africa, but has the option to select any month. Initially a map is presented which shows surface isobars and semi-permanent objects (pressure centers) for the chosen month. The user can also select for display, additional data layers showing climate commonality zone boundaries, additional objects (jets, ridges, etc.) or zoom to display cities/towns. Only synoptic objects appropriate for the chosen month are shown. Climatic information pertaining to any of the displayed objects can be obtained by selecting (highlighting) the feature with the mouse. Descriptions of object include a discussion of its climatological effect on the region that has been selected by the user.

Following the approach taken by Vojtesak, (1990) the Horn of Africa in synoptic climatology expert system has been segregated into four zones of climate commonality. The user can obtain a description of each zone, by season, in terms of the following five parameters; precipitation, temperature, visibility, cloud cover, and wind speed and direction. More importantly, however the user can select one or more mission points in each zone or across multiple zones and invoke the expert system inference engine via a pull down menu. The system will evaluate any site specific and/or general rules for the selected points and display results in terms of the five parameters and display any alerts or warnings about possible dangerous weather phenomena. For example, if the user selects a point in a region subject to a regional wind the system will determine if the time of year selected for such a wind to occur is correct and will display any appropriate alerts, description and statistics (frequency, time of occurrence, maximum wind speed), regarding the phenomena.

Synoptic climatology expert system's most powerful function, user manipulation of objects is invoked using the same display map provided for all other functions. The user selects, with the mouse, the object he wishes to manipulate. Using the right mouse button the user is presented with the choice of moving the objects location and/or changing its intensity (ex. pressure, etc.). When manipulating the object a set of constraints is displayed which the user cannot exceed. Constraints displayed are conservative, based upon historical extreme values. In order to see the effects of object movement a mission point must be chosen and the inference engine started. Results will be displayed both on the map display and in terms of the five parameters, for example as shown at the bottom of the screen as shown in FIG. 7.

It is important to point out that in all cases when the system is run the user can display an explanation of how the expert system arrived at a result. Rules that were executed will be displayed along with a rule description.

Some of the functionality of synoptic climatology expert system, such as providing statistical data is not unique. However the use of an object oriented data structure and implementation of an expert system provides some unique and important advantages and capabilities.

Interactive Data and Rule Base—Knowledge is not static! The user can access more than just fixed climatological text or data. He or she can simulate different synoptic scenarios and view the associated weather effects. This capability gives the user a greater feel for how various meteorological objects and inputs affect the weather of a certain area and allows the user to try to mimic the current weather pattern of an area of interest.

Explanation Facility—Unlike conventional programs, expert systems can show the user how it arrived at a particular conclusion or result. This can be a valuable training aid. The user, who may have limited experience in the region of interest, is given more than final system output. The user can follow the logic (rules) the system used, learn that logic, and apply it later. It also provides the user with an opportunity to disagree with the system result. For example, the user may not agree with a certain part of the logic used, and thus he or she can modify the system result based on their own logic or expertise.

Adaptability and Flexibility—The object-oriented structure and modular design allows for efficient storage of meteorological data and knowledge. New data and rules can be added or old data/rules modified, without significant programming or data structure changes. This makes the system very adaptable to updates or expansion.

Preservation of Expertise—The system stores more than statistical data and descriptive text. It consolidates in one place both documented and undocumented expertise (knowledge, rules of thumb, logic) from various types of personnel (meteorologists, observers, technicians, etc.), some of who may retire or be inaccessible in future years.

The preferred embodiment proves the feasibility of the synoptic climatology expert system concept. The scope of this invention covers other geographic regions of the world for both military and commercial applications.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An expert system for synoptic climatology comprising:
   a user interface;
   an inference engine;
   a synoptic climatology knowledge base, wherein
   said user interface interacts with a user and obtains information on geographical information,
   said inference engine executes expert rules based on the geographical information and rules, and
   said synoptic climatology knowledge base provides said inference engine with said expert rules.

2. An expert system according to claim 1 wherein said user interface comprises geographical information in the form of digitized maps.

3. An expert system according to claim 2 wherein said geographical information is a Geographic Information System.

4. An expert system according to claim 1 wherein said user interface further comprises:
   a window for displaying maps;
   a window for displaying temperature;
   a window for displaying wind speed;
   a window for displaying rainfall;
   a window for displaying visibility; and
   a window for displaying cloud cover.

5. An expert system according to claim 4 wherein each of said windows display information including graphical information.

6. An expert system according to claim 4 wherein said wind speed is displayed as wind rose.

7. An expert system according to claim 4 wherein said temperature is displayed as a thermometer reading.

8. An expert system according to claim 1 wherein the knowledge base, the user interface and the inference engine are connected to each other remotely.

9. An expert system according to claim 1 wherein said user interface is in C++ programming language.

10. An expert system according to claim 1 wherein said inference engine is a production system.

11. An expert system according to claim 1 wherein said inference engine is in Prolog programming language.

12. An expert system according to claim 1 wherein said knowldge base comprises data and a plurality of rule bases.

13. An expert system according to claim 12 wherein said plurality of rule bases are in a production system form.

14. An expert system according to claim 12 wherein said data is represented in the form of frames.

15. An expert system according to claim 12, wherein said plurality of rule bases comprise a first subset of rule bases describing normal weather patterns and a second subset of rule bases describing changes from the normal weather pattern.

16. A method of representing geographical information (related to synoptic climatology) for use in an expert system comprising:

partitioning the world into climatic regions;

partitioning said climatic regions into subregions;

partitioning said subregions into zones of climatic commonality;

putting said climatic regions, said subregions and said zones of climatic commonality into a frame hierarchy.

17. A method according to claim 16 wherein said climatic regions comprise southwest Asia and northeast Africa.

18. A method according to claim 16 wherein said climatic region of southwest Asia and northeast Africa is partitioned into subregions of horn of Africa, middle eastern peninsula, near east mountains and Mediterranean coast & northeast Africa.

19. A method according to claim 18 wherein said subregion of horn of Africa is further partitioned into zones of climatic commanility comprising Indian ocean plain, Aden coastal fringe, Ethiopian highlands and Yemen highlands.

20. A method of representing climatic information for use in an expert system for climatology comprising:

partitioning weather systems into surface and upper level weather systems;

partitioning said surface weather systems into synoptic and sub-synoptic scales; and putting said weather systems, said surface and upper level weather systems into a frame hierarchy.

21. A method according to claim 20 further comprising:

partitioning said synoptic scale into migratory and semi-permanent systems;

partitioning said sub-synoptic scale into wind circulations, special phenomenon, convergence zones and local winds; and putting said weather systems, said migratory, semi-permanent systems, wind circulation, special phenomenon, convergence zones and local winds into a frame hierarchy.

22. A method according to claim 21 wherein said migratory system comprises extratropical cyclones, discontinuities, air masses, subtropical cyclones and tropical cyclones.

23. A method according to claim 21 wherein said semi-permanent system comprises pressure highs, pressure lows, low-level jets and discontinuities.

24. A method according to claim 23 wherein said pressure highs further comprise Mascarene high, Asiatic high, Azores high, Saharan high and Saudi Arabian high.

25. A method according to claim 23 wherein said pressure lows further comprise Icelandic low, Pakistani low, Sudanese low, Saharan low and Saudi Arabian low.

26. A method according to claim 23 wherein said low level jets further comprise Somali jets.

27. A method according to claim 23 wherein said discontinuities further comprise inter tropical convergence zone and monsoon trough.

28. A method according to claim 21 wherein said wind circulations comprise sea breeze, land breeze and mountain-valley wind.

29. A method according to claim 21 wherein said local winds comprise etesian, sharav, khamsin, kaus, sirocco, karif and belat.

30. A method according to claim 21 wherein said convergence zones comprise omani convergence zone and red sea convergence zone.

31. A method according to claim 21 wherein said special phenomenon comprise dust storm, thunderstorm, dust devil, tornado, floods and droughts.

32. A computer program product including a computer readable set of instructions and a computer media that enable the computer to perform according to the following steps:

inputting geographical information;

inputting time information;

inputting abnormal condition information;

running an expert system rule base for climatology; and receiving climatological information.

33. A computer program product according to claim 32 wherein said readable set of instructions are in C++.

34. A computer program product according to claim 32 wherein said expert system rule base is in the form of a production system.

35. A computer program product according to claim 34 wherein said production system rule base is in Prolog.

* * * * *